United States Patent [19]
Ganser et al.

[11] 4,002,310
[45] Jan. 11, 1977

[54] REEL FOR PHOTOGRAPHING PAPER OR THE LIKE
[75] Inventors: Friedrich Ganser, Feldkirchen; Thomas Hammer, Munich; Hans Dieter Frick, Taufkirchen; Wolfgang Viehrig, Munich; Karl Heinz Ritter, Karlsfeld; Wolfgang Kwiatkowski, Unterhaching; Viktor Osegowitsch, Taufkirchen; Josef Glass, Ottobrunn; Erwin Laar, Taufkirchen, all of Germany
[73] Assignee: AGFA - Gevaert AG, Leverkusen, Germany
[22] Filed: Sept. 22, 1975
[21] Appl. No.: 615,792
[30] Foreign Application Priority Data
Sept. 26, 1974 Germany .................... 7432380[U]
[52] U.S. Cl. ................................ 242/71.8
[51] Int. Cl.² ........................... B65H 75/18
[58] Field of Search ............. 242/71.8, 74, 71.8 A, 242/115, 116, 118.4, 118.6

[56] References Cited
UNITED STATES PATENTS

| 2,992,789 | 7/1961 | Sardeson | 242/71.8 A |
| 3,399,845 | 9/1968 | Krtous | 242/74 |
| 3,726,489 | 4/1973 | Honsa | 242/71.8 |

FOREIGN PATENTS OR APPLICATIONS

| 18,955 | 1968 | Japan | 242/74 |

OTHER PUBLICATIONS

IBM Technical Disclosure Bulletin – vol. 5, No. 1, June 1962, "Flexible Tape Reel", E. L. Dombroski.

Primary Examiner—Edward J. McCarthy
Attorney, Agent, or Firm—Michael J. Striker

[57] ABSTRACT

A reel for photographic paper has a hollow cylindrical core and two disk-shaped flanges having centrally located extensions received in the respective end portions of the core. The inner side of each flange tapers outwardly in a direction from the periphery of the core toward the periphery of the respective flange. The extensions have ribs which penetrate into the inner surface of the core, and the core is further coupled to each flange by a rubber hose which surrounds the respective extension and is biased against the inner surface of the core by an endless helical spring which surrounds a conical end face of the corresponding extension.

11 Claims, 3 Drawing Figures

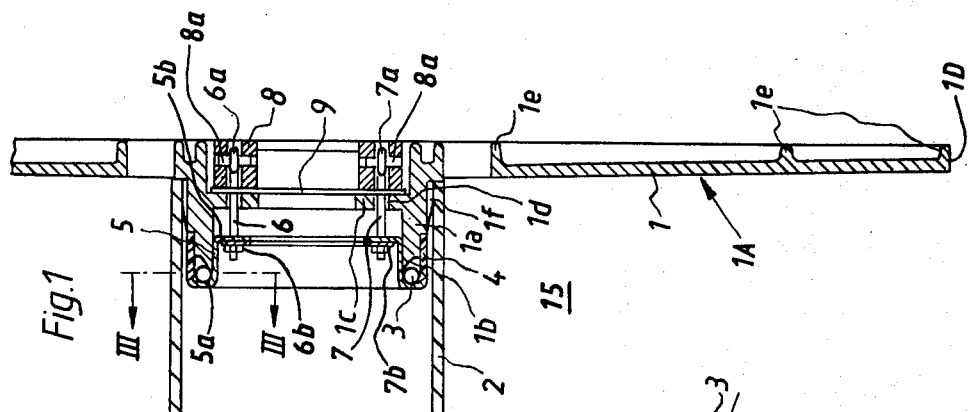
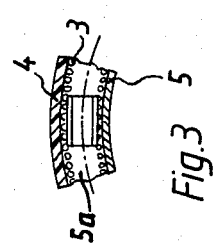
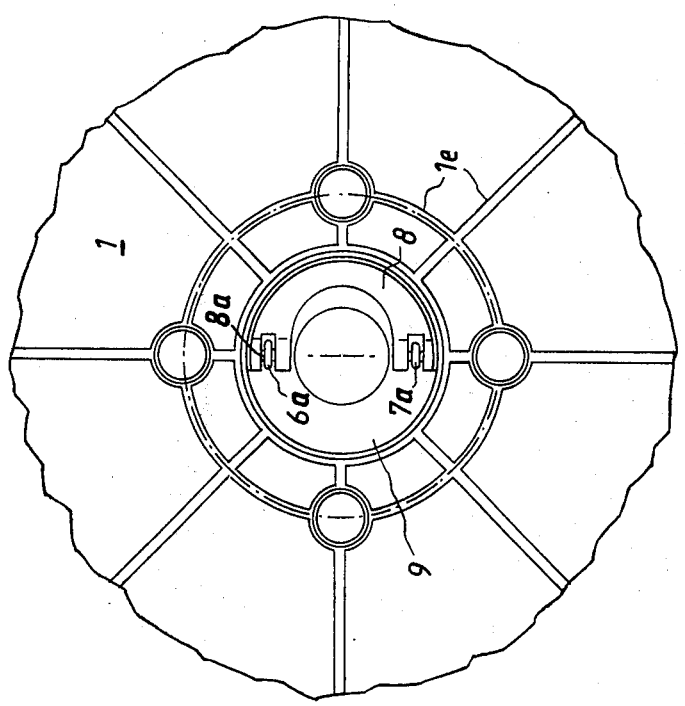

REEL FOR PHOTOGRAPHING PAPER OR THE LIKE

BACKGROUND OF THE INVENTION

The present invention relates to spools or reels for use as a means for collecting or paying out webs or strips of flexible material, and more particularly to improvements in reels or spools which can be used with advantage for storage of photographic paper or the like. Still more particularly, the invention relates to improvements in reels or spools of the type wherein the core which supports convoluted web material is permanently but preferably separably connected with at least one flange.

It is already known to make the core of a reel for photographic web material from cardboard or the like and to connect the ends of the core with two discrete disk-shaped flanges having parallel inner sides or surfaces so that the width of the annular space between the flanges is constant all the way from the periphery of the core to the peripheries of the flanges. As a rule, the width of the annular space equals or only slightly exceeds the width of a web which is to be convoluted onto the core. A drawback of such reels is that, when the web which is being convoluted onto the core is inclined so that its marginal portions are not exactly normal to the axis of the core, one marginal portion of the web bears against the adjacent flange with a substantial force, especially in the region close to the periphery of the flange, whereby the web is likely to be damaged, e.g., the web can break or develops a frayed marginal portion. The likelihood of damage to the web can be reduced by employing flanges which are yieldable within certain limits, especially if the web to be collected by the core is relatively short (e.g., in the range of up to 100 meters); however, the flanges of relatively large reels must be rigid, particularly if the core is to collect up to and in excess of 300 meters of web material.

SUMMARY OF THE INVENTION

An object of the invention is to provide a reel or spool wherein the flange of flanges cannot damage or deface the web, even if the web is supplied to or withdrawn from the reel at an oblique angle to the axis of the core and irrespective of the length of the web which is to be stored on or paid out by the reel.

Another object of the invention is to provide novel and improved flanges for use in reels for storage of photographic paper webs or the like.

A further object of the invention is to provide a novel and improved separable connection between the core and the flange or flanges of a spool or reel for storage of substantial lengths of web-like flexible material.

An additional object of the invention is to provide a reel whose flange or flanges need not be elastic or deformable in order to avoid damage to a web which is being moved at an oblique angle to the axis of the core.

Another object of the invention is to provide a reel whose operation during collection or withdrawal of webs is quieter than that of conventional reels and which produces little, if any, dust as a result of frictional engagement between the web and a flange during coiling of a web onto or its unwinding from the core.

The invention is embodied in a reel for collection or paying out of flexible web material, particularly photographic paper. The reel comprises a preferably hollow cylindrical core having two end portions, and at least one substantially disk-shaped flange connected with and adjacent to one end portion of the core. The flange has an inner side facing toward the other end portion of the core and a peripheral surface. At least a portion (preferably at least the major portion) of the inner side of the flange is a conical surface (with a conicity in the range of one or two degrees) which tapers outwardly from the periphery of the core toward the peripheral surface of the flange. The core may consist of cardboard, and the flange may consist of a synthetic thermoplastic material.

The flange is preferably formed with a centrally located hollow cylindrical extension which is received in the respective end portion of the core and has external ribs extending in parallelism with the axis of the core. The ribs engage and preferably penetrate into the inner surface of the core.

The novel features which are considered as characteristic of the invention are set forth in particular in the appended claims. The improved reel itself, however, both as to its construction and the mode of assembling and using the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary axial sectional view of a reel which embodies the invention;

FIG. 2 is an end elevational view of the reel as seen from the right-hand side of FIG. 1; and FIG. 3 is a fragmentary sectional view as seen in the direction of arrows from the line III—III of FIG. 1.

DESCRIPTION OF THE PREFERRED EMBODIMENTS

Referring to FIGS. 1 and 2, there is shown a reel or spool consisting of a hollow cylindrical core 2 made of cardboard or the like, one or two (preferably two) flanges 1, and means for separably coupling each flange to the respective end of the core. In accordance with a feature of the invention, at least a portion of that side or surface (1A) of each flange 1 which is adjacent to the annular space 15 surrounding the periphery of the core 2 has generatrices which are not exactly normal to the axis of the core. FIG. 1 merely shows a single flange 1; however, it will be understood that the reel may have two flanges which are mirror symmetrical to each other with reference to a plane which is normal to the axis of and halves the core 2.

The illustrated flange 1 is a one-piece disk-shaped body which is made of suitable synthetic plastic material, preferably thermoplastic material, and may be mass-produced by resorting to injection molding or another suitable technique. That (inner) portion of the surface 1A which is immediately adjacent to the core 5 is normal to the axis of the core; the outer portion of the surface 1A is slightly conical and slopes outwardly toward the periphery 1D of the flange at an angle of 1°–2° to the axis of the core. The median portion of the flange 1 has a hollow circular cylindrical extension 1a which is fitted into the adjacent end portion of the core 2. The free end portion of the extension 1a has a conical end face 1b making an angle of 45° with the axis of the core 2. The median portion of the extension 1a has an internal partition 1c which is normal to the axis of the flange 1 and has two holes 1d parallel to the axis of the extension 1a and disposed diametrically opposite each other. The outer side of the flange 1 has radial and/or circular reinforcing or stiffening ribs 1e.

That portion of the extension 1a which is immediately adjacent to the surface 1A has a smooth cylindrical external surface having a width (as considered in the axial direction of the flange) not exceeding one millimeter and a diameter equal to the outer diameter of the core 2. The adjacent portion of the external surface of the extension 1a has an annulus of ribs 1f which are parallel to the axis of the flange 1 and whose height diminishes as considered in a direction away from the surface 1A. The material of the core 2 is relatively soft so that the ribs 1f can penetrate into such material to hold the core against rotation with respect to the flange and vice versa. The ribs 1f penetrate into the internal surface of the adjacent end portion of the core. The latter resembles a piece of tube, i.e., a hollow cylinder.

The conical end face 1b of the extension 1a is surrounded by an endless helical spring 3 which, in turn, is surrounded by a short hose 4 made of rubber or other suitable elastomeric material. A portion of the hose 4 is slipped onto that part of the extension 1a which is adjacent to the end face 1b. A sheet metal sleeve 5 is inserted into the extension 1a and comprises an outwardly bent hook-shaped collar 5a which overlies the spring 3 and forms a seat into which the spring extends so that it cannot slide off the conical end face 1b. The sleeve 5 has an end wall 5b with two holes in register with the holes 1d of the partition 1c. These holes receive the shanks of two elongated screws 6, 7 having eyelets 6a, 7a at the outer side of the partition 1c and meshing with nuts 6b, 7b which are adjacent to the inner side of the bottom wall 5b. The eyelets 6a, 7a receive eccentric trunnions 8a of an arcuate tensioning member 8 which is pivotable back and forth along an arc of 180° and is outwardly adjacent to a sheet metal disk 9 in the outermost portion of the extension 1a. The parts 3, 5, 6, 7, 8 together constitute a device for biasing the hose 4 against the internal surface of the core 2 and for thereby coupling (in cooperation with ribs 1f) the extension 1a to the respective end portion of the core.

The thickness of the extension 1a decreases in a direction toward the other flange and the outer diameter of the extension in less than the inner diameter of the respective end portion of the core 2.

THE OPERATION

At first, the spring 3 and the tensioning member 8 assume the positions shown in FIG. 1. The extension 1a of the illustrated flange 1 is inserted into the adjacent end portion of the core 2 (and the extension of a second flange is preferably inserted into the other end portion of the core). The tensioning member 8 is thereupon pivoted through 180° so that its eccentric trunnions 8a pull the screws 6, 7 outwardly (in a direction to the right, as viewed in FIG. 1) whereby the hook-shaped portion 5a of the sleeve 5 causes the spring 3 to slide along the conical end face 1b toward the outer surface of the extension 1a so that the diameter of the spring 3 increases. The thus expanded spring 3 urges the hose 4 against the internal surface of the core 2 to thereby reduce the likelihood of angular and/or axial movement of the core with respect to the flange 1 or vice versa. The ribs 1f (which have penetrated into the internal surface of the relatively soft core 2) assist the hose 4 in holding the core against angular movement relative to the flange 1. A relatively strong connection between the core and the flange is desirable for obvious reasons and additionally on the ground that at least the outer portion of the inner side 1A of the flange 1 slopes outwardly so that the width of the annular space 15 increases in a direction toward the periphery 1D of the flange. As will be explained below, such configuration of the inner side 1A might result in the application of relatively strong forces which tend to move the extension 1a out of the respective end portion of the core.

The web to be stored on the thus assembled reel is coiled around the core 2 between the flanges 1 so that it forms one or more convolutions. This normally suffices to insure that the innermost convolution cannot slip with respect to the core. The reel is thereupon rotated in a direction to collect the web, e.g., by resorting to two or more driven friction wheels (not shown) which engage the periphery 1D of at least one flange. If the web to be collected is not exactly tangential to the core 2 and its marginal portions are not exactly normal to the axis of the reel, one marginal portion of the web bears against the inner side 1A of the one or the other flange 1. The same or a similar situation arises if the innermost convolutions of the web are not located exactly midway between the flanges. Due to the aforementioned inclination or conicity of the inner side 1A, the flange which is engaged by one marginal portion of the web acts as a means for gradually centering the web between the two inner sides 1A; this insures that the web is not damaged and that its marginal portion (which was in rubbing contact with one of the inner sides 1A) does does not become frayed or otherwise defaced.

The conical inner sides 1A of the flanges 1 are equally important and advantageous when the reel is rotated in a direction to pay out a supply of convoluted web, either by positively rotating the reel, by pulling the leader of the web, or both. The web which is being withdrawn from the space 15 at an oblique angle to the axis of the reel is out of contact with the inner sides 1A of the respective flanges because the outermost convolutions of a reasonably long web are invariably located close to the peripheries 1D of the flanges, i.e., between those portions of the inner sides 1A which diverge outwardly and away from the core 2. Consequently, the marginal portions of the web cannot be damaged. This is desirable and advantageous because the difference between the speed of the web which is being withdrawn and the outer portions of the inner side 1A is relatively high. Such difference is negligible between the preferably parallel radially innermost portions of the inner side 1A and the web which is being withdrawn from the region close to the periphery of the core 2. Frictional engagement between one marginal portion of the web and the outer portion of an inner side 1A could result in generation of readily detectable noise and would cause extensive wear of the web. Also, the collecting or paying out of the web could produce dust which would deposit of the photosensitive emulsion of the web or would contaminate the copying machine. It has been found that, as a rule, the web is likely to contact the one or the other flange only in the innermost portion of the annular space 15 which is much less damaging than a longer-lasting contact between one marginal portion of the web and the respective flange, mainly because the difference between the speed of lengthwise movement of the web during collecting or paying out and the innermost portions of the sides 1A is negligible.

It is clear that the improved reel can be used with equal advantage for storage of other types of flexible web- or strip-shaped materials, irrespective of whether the flange or flanges are permanently or separably connected to or made integral with the core, as long as at least a portion of the inner side of at least one flange tapers in a direction to increase the width of the annular space around the core in a direction from the periphery of the core toward the periphery of the flange.

Another important advantage of the improved reel is that, even if one marginal portion of the web comes in contact with the adjacent flange, such contact is linear rather than a point contact, and this also contributes to reduction of noise, to generation of less dust and to less pronounced wear upon the web. This will be readily appreciated by considering that, when the entire inner sides of both flanges forming part of a conventional reel are exactly parallel to each other, and the web is at a slant during collection onto or withdrawal from the core, one marginal portion of the web will bear primarily or exclusively against the edge between the inner side and the periphery of the respective flange. On the other hand, if the web runs at a slant to engage the conical portion of the improved flange, it is in linear contact with such conical portion; moreover, the conical portion centers the web so that the latter is disengaged from the conical portion and begins to form convolutions which are out of contact with both flanges.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In a reel for collection or paying out of flexible web material, particularly photographic paper, a combination comprising a core having two end portions and a cylindrical external surface; and at least one substantially disk-shaped flange connected with and adjacent to one end portion of said core, said flange having a periphery, a short cylindrical portion having an outer surface of the same diameter as said external surface of said core and merging with the same, and a conical surface extending between said cylindrical portion of said flange and said periphery and tapering outwardly in a direction away from said one end portion.

2. A combination as defined in claim 1, wherein the conicity of said surface equals or approximates one degree.

3. A combination as defined in claim 1, wherein said core consists of cardboard.

4. A combination as defined in claim 1, wherein said core is a hollow cylinder and said flange has a centrally located substantially cylindrical extension received in said one end portion, said extension having external ribs parallel to the axis of said core and engaging said one end portion from within.

5. A combination as defined in claim 1, wherein said core is a hollow cylinder and said flange has a centrally located extension received in said one end portion of said core, and further comprising means for separably coupling said extension to said core.

6. A combination as defined in claim 5, wherein said extension has a conical end face remote from said inner side and tapering in a direction toward said other end portion, said coupling means comprising a helical spring surrounding said conical end face, a resilient hose surrounding said spring and means for biasing said hose against the internal surface of said one end portion through the medium of said spring.

7. In a reel for collection or paying out of flexible web material, particularly photographic paper, a combination comprising a hollow cylindrical core having two end portions; and at least one substantially disk-shaped flange connected with and adjacent to one end portion of said core, said flange having an inner side facing toward the other of said end portions and a periphery, at least that portion of said inner side which is remote from said core being a conical surface which tapers outwardly in a direction away from said other end portion and toward said periphery, said flange further having a centrally located extension received in said one end portion of said core and having a conical end face remote from said inner side and tapering in a direction toward said other end portion, and means for separably coupling said extension to said core including a helical spring surrounding said conical end face, a resilient hose surrounding said spring and means for biasing said hose against the internal surface of said one end portion through the medium of said spring.

8. A combination as defined in claim 7, wherein said core has a cylindrical outer surface and said inner side of said flange has a short cylindrical portion having an outer surface with a diameter equal to the diameter of the outer surface of said core.

9. A combination as defined in claim 7, wherein the conicity of said end face is approximately 45°.

10. A combination as defined in claim 7, wherein said extension is hollow and said biasing means comprises a sleeve axially movably mounted in said extension and having an outwardly flaring flange overlying said end face and defining a seat for said spring, and means for moving said sleeve axially of said extension to thereby increase the diameter of said spring by causing the latter to move along said end face and to thereby engage and expand said hose.

11. A combination as defined in claim 10, wherein said means for moving said flange comprises a tensioning member which is accessible at the outer side of said flange.

* * * * *